US012308940B2

(12) United States Patent
Yin et al.

(10) Patent No.: US 12,308,940 B2
(45) Date of Patent: May 20, 2025

(54) AIRCRAFT BEAM MUTING FOR MULTI-AIRCRAFT EMERGENCY MESSAGE RELAYING

(71) Applicant: QUALCOMM Incorporated, San Diego, CA (US)

(72) Inventors: Mingxi Yin, Beijing (CN); Kangqi Liu, San Diego, CA (US); Chao Wei, Beijing (CN); Ruiming Zheng, Beijing (CN); Qiaoyu Li, Beijing (CN); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 168 days.

(21) Appl. No.: 18/295,502

(22) Filed: Apr. 4, 2023

(65) Prior Publication Data

US 2024/0340079 A1      Oct. 10, 2024

(51) Int. Cl.
*H04B 7/185* (2006.01)
*H04W 16/28* (2009.01)

(52) U.S. Cl.
CPC ....... *H04B 7/1853* (2013.01); *H04B 7/18508* (2013.01); *H04B 7/18534* (2013.01); *H04W 16/28* (2013.01)

(58) Field of Classification Search
CPC .............. H04B 7/1853; H04B 7/18508; H04B 7/18534; H04B 7/024; H04B 7/0695; H04B 7/18504; H04W 16/28
See application file for complete search history.

(56) References Cited

U.S. PATENT DOCUMENTS

| | | | |
|---|---|---|---|
| 6,018,659 A | 1/2000 | Ayyagari et al. | |
| 2017/0126309 A1 | 5/2017 | Rupasinghe et al. | |
| 2019/0096262 A1* | 3/2019 | Dotzler | G08G 1/091 |
| 2022/0190910 A1 | 6/2022 | Wang et al. | |
| 2023/0120473 A1* | 4/2023 | Ji | H04L 5/0053 |
| | | | 370/503 |

FOREIGN PATENT DOCUMENTS

CN     115103409 A     9/2022

OTHER PUBLICATIONS

International Search Report and Written Opinion—PCT/US2024/015930—ISA/EPO—Jun. 11, 2024.

* cited by examiner

*Primary Examiner* — Ashley Shivers
(74) *Attorney, Agent, or Firm* — Harrity & Harrity, LLP

(57) ABSTRACT

Various aspects of the present disclosure generally relate to wireless communication. In some aspects, an aerial node may determine, among a set of beams, one or more beams to be muted to mitigate potential interference associated with multiple aerial nodes transmitting to a terrestrial user equipment (UE). The aerial node may mute the one or more beams while transmitting, to the terrestrial UE, at least one of a discovery signal or feedback related to an emergency message relaying service. Numerous other aspects are described.

30 Claims, 10 Drawing Sheets

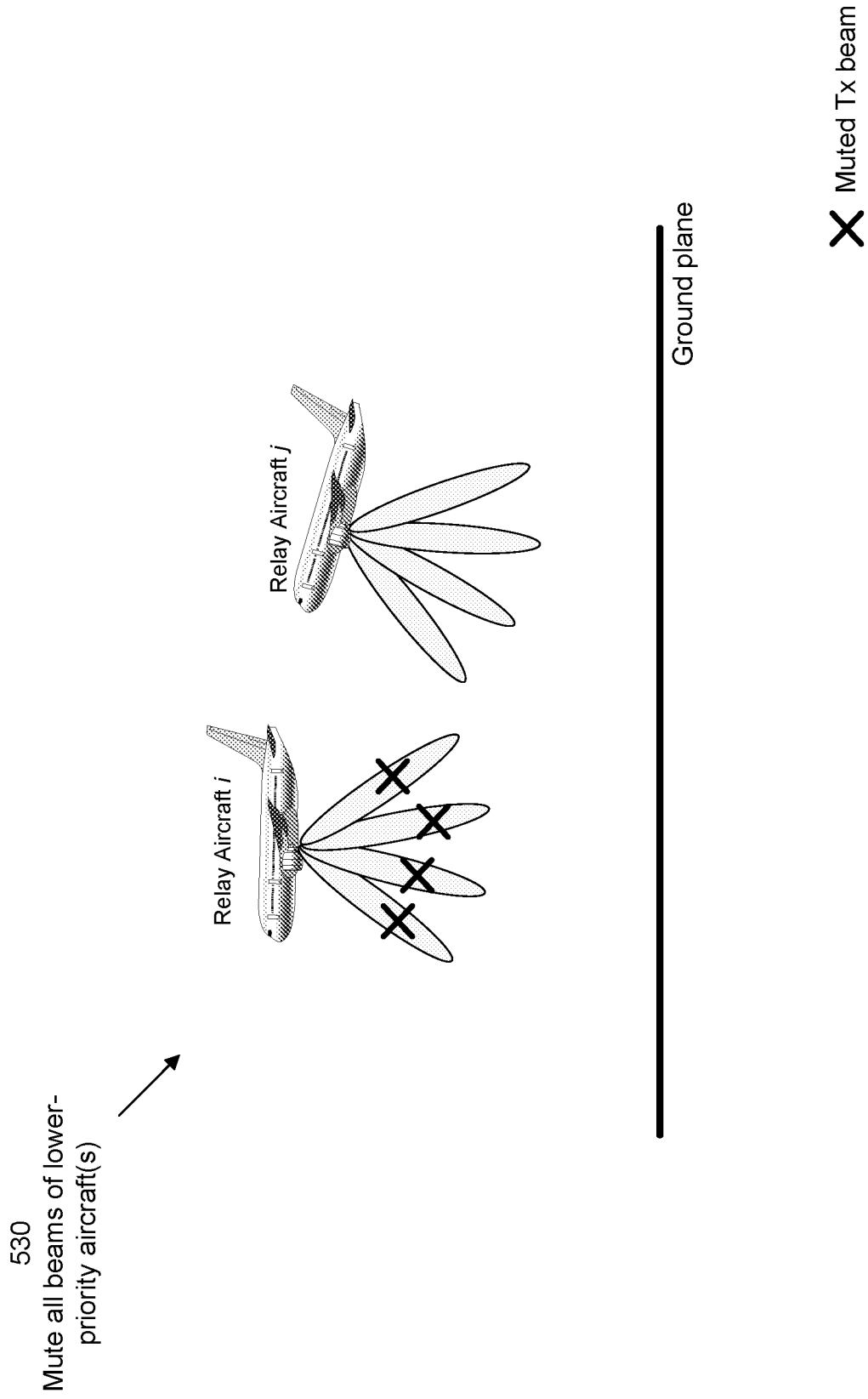

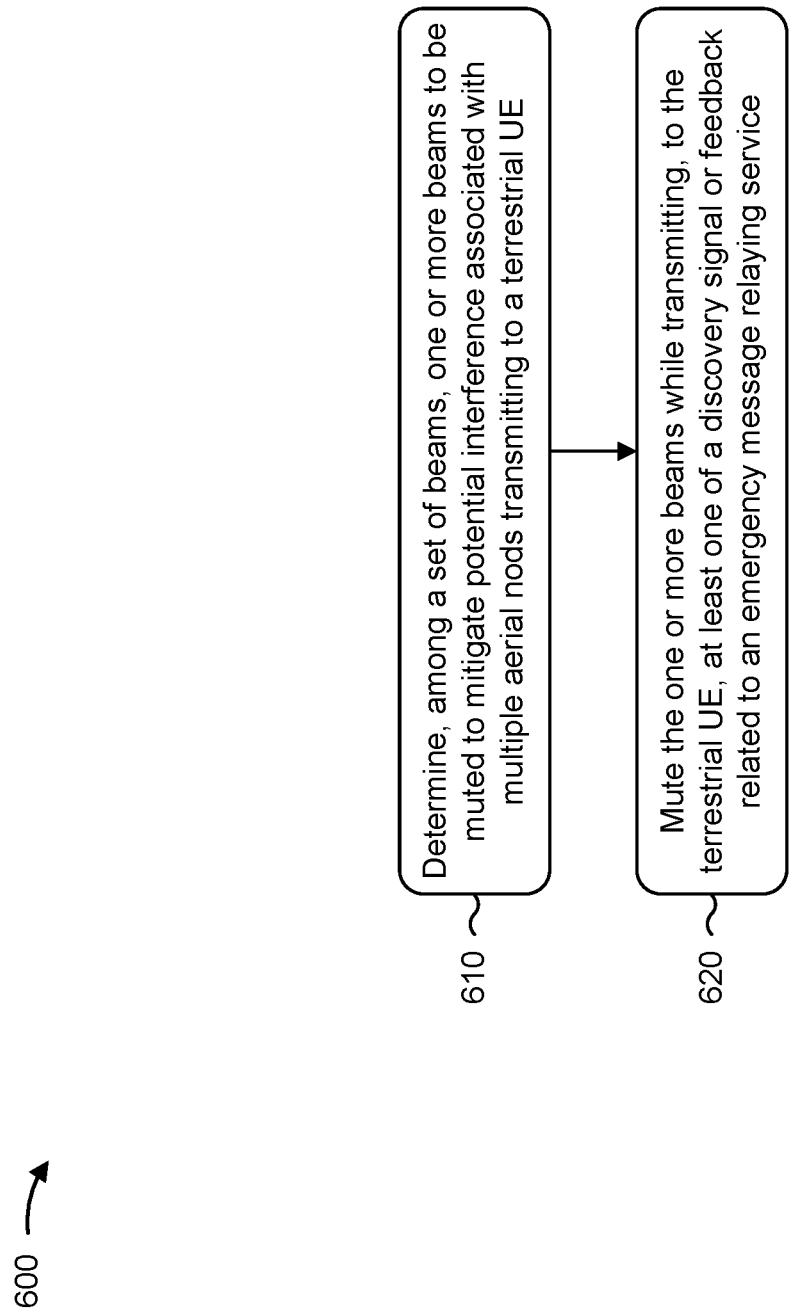

AIRCRAFT BEAM MUTING FOR MULTI-AIRCRAFT EMERGENCY MESSAGE RELAYING

FIELD OF THE DISCLOSURE

Aspects of the present disclosure generally relate to wireless communication and to techniques and apparatuses associated with aircraft beam muting for multi-aircraft emergency message relaying.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to an aerial node for wireless communication. The aerial node may include a memory and one or more processors coupled to the memory. The one or more processors may be configured to determine, among a set of beams, one or more beams to be muted to mitigate potential interference associated with multiple aerial nodes transmitting to a terrestrial user equipment (UE). The one or more processors may be configured to mute the one or more beams while transmitting, to the terrestrial UE, at least one of a discovery signal or feedback related to an emergency message relaying service.

Some aspects described herein relate to a method of wireless communication performed by an aerial node. The method may include determining, among a set of beams, one or more beams to be muted to mitigate potential interference associated with multiple aerial nodes transmitting to a terrestrial UE. The method may include muting the one or more beams while transmitting, to the terrestrial UE, at least one of a discovery signal or feedback related to an emergency message relaying service.

Some aspects described herein relate to a non-transitory computer-readable medium that stores a set of instructions for wireless communication. The set of instructions, when executed by one or more processors of an aerial node, may cause the aerial node to determine, among a set of beams, one or more beams to be muted to mitigate potential interference associated with multiple aerial nodes transmitting to a terrestrial UE. The set of instructions, when executed by one or more processors of the aerial node, may cause the aerial node to mute the one or more beams while transmitting, to the terrestrial UE, at least one of a discovery signal or feedback related to an emergency message relaying service.

Some aspects described herein relate to an apparatus for wireless communication. The apparatus may include means for determining, among a set of beams, one or more beams to be muted to mitigate potential interference associated with multiple aerial nodes transmitting to a terrestrial UE. The apparatus may include means for muting the one or more beams while transmitting, to the terrestrial UE, at least one of a discovery signal or feedback related to an emergency message relaying service.

Aspects generally include a method, apparatus, system, computer program product, non-transitory computer-readable medium, user equipment, base station, wireless communication device, node, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals May include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 5A-5D are diagrams illustrating examples associated with aircraft beam muting for multi-aircraft emergency message relaying, in accordance with the present disclosure.

FIG. 6 is a diagram illustrating an example process associated with aircraft beam muting for multi-aircraft emergency message relaying, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
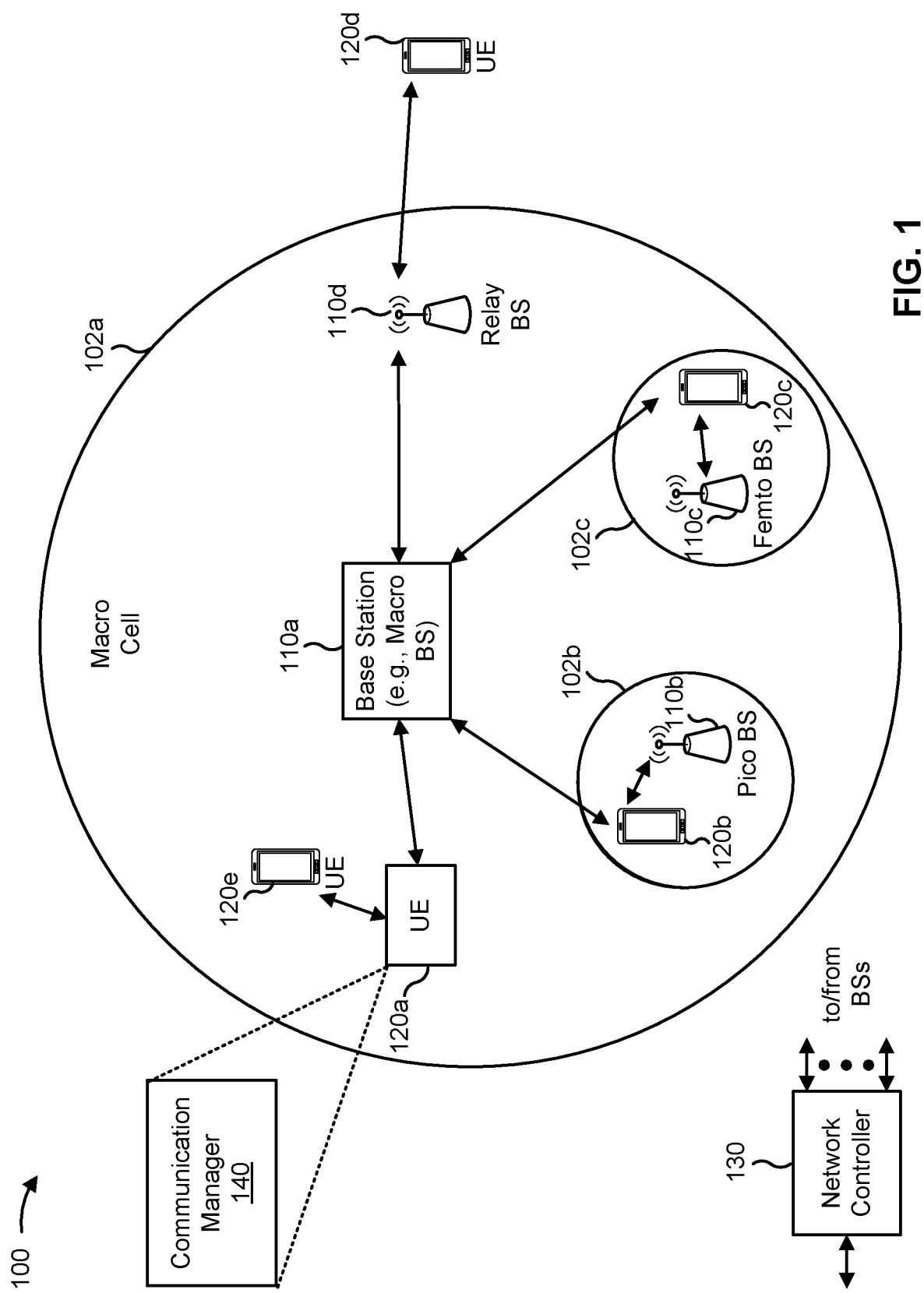
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110*a*, a BS 110*b*, a BS 110*c*, and a BS 110*d*), a user equipment (UE) 120 or multiple UEs 120 (shown as a UE 120*a*, a UE 120*b*, a UE 120*c*, a UE 120*d*, and a UE 120*e*), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110*a* may be a macro base station for a macro cell 102*a*, the BS 110*b* may be a pico base station for a pico cell 102*b*, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120c) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHZ) and FR2 (24.25 GHZ-52.6 GHZ). It should be understood that although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHZ-300 GHZ) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHZ. For example, three higher operating bands have been identified as frequency range designations FR4a or FR4-1 (52.6 GHZ-71 GHz), FR4 (52.6 GHZ-114.25 GHZ), and FR5 (114.25 GHZ-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHZ, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the term "base station" (e.g., the base station 110) or "network node" or "network entity" may refer to an aggregated base station, a disaggregated base station (e.g., described in connection with FIG. 9), an integrated access and backhaul (IAB) node, a relay node, and/or one or more components thereof. For example, in some aspects, "base station," "network node," or "network entity" may refer to a central unit (CU), a distributed unit (DU), a radio unit (RU), a Near-Real Time (Near-RT) RAN Intelligent Controller (RIC), or a Non-Real Time (Non-RT) RIC, or a combination thereof. In some aspects, the term "base station," "network node," or "network entity" may refer to one device configured to perform one or more functions, such as those described herein in connection with the base station 110. In some aspects, the term "base station," "network node," or "network entity" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station," "network node," or "network entity" may refer to any one or more of those different devices. In some aspects, the term "base station," "network node," or "network entity" may refer to one or more virtual base stations and/or one or more virtual base station functions. For example, in some aspects, two or more base station functions may be instantiated on a single device. In some aspects, the term "base station," "network node," or "network entity" may refer to one of the base station functions and not another. In this way, a single device may include more than one base station.

In some aspects, the UE 120 may correspond to an aerial node that includes a communication manager 140. As described in more detail elsewhere herein, the communication manager 140 may determine, among a set of beams, one or more beams to be muted to mitigate potential interference associated with multiple aerial nodes transmitting to a terrestrial UE 120; and mute the one or more beams while transmitting, to the terrestrial UE 120, at least one of a discovery signal or feedback related to an emergency message relaying service. Additionally, or alternatively, the communication manager 140 may perform one or more other operations described herein.

As indicated above, FIG. 1 is provided as an example. Other examples may differ from what is described with regard to FIG. 1.

Figure 2:
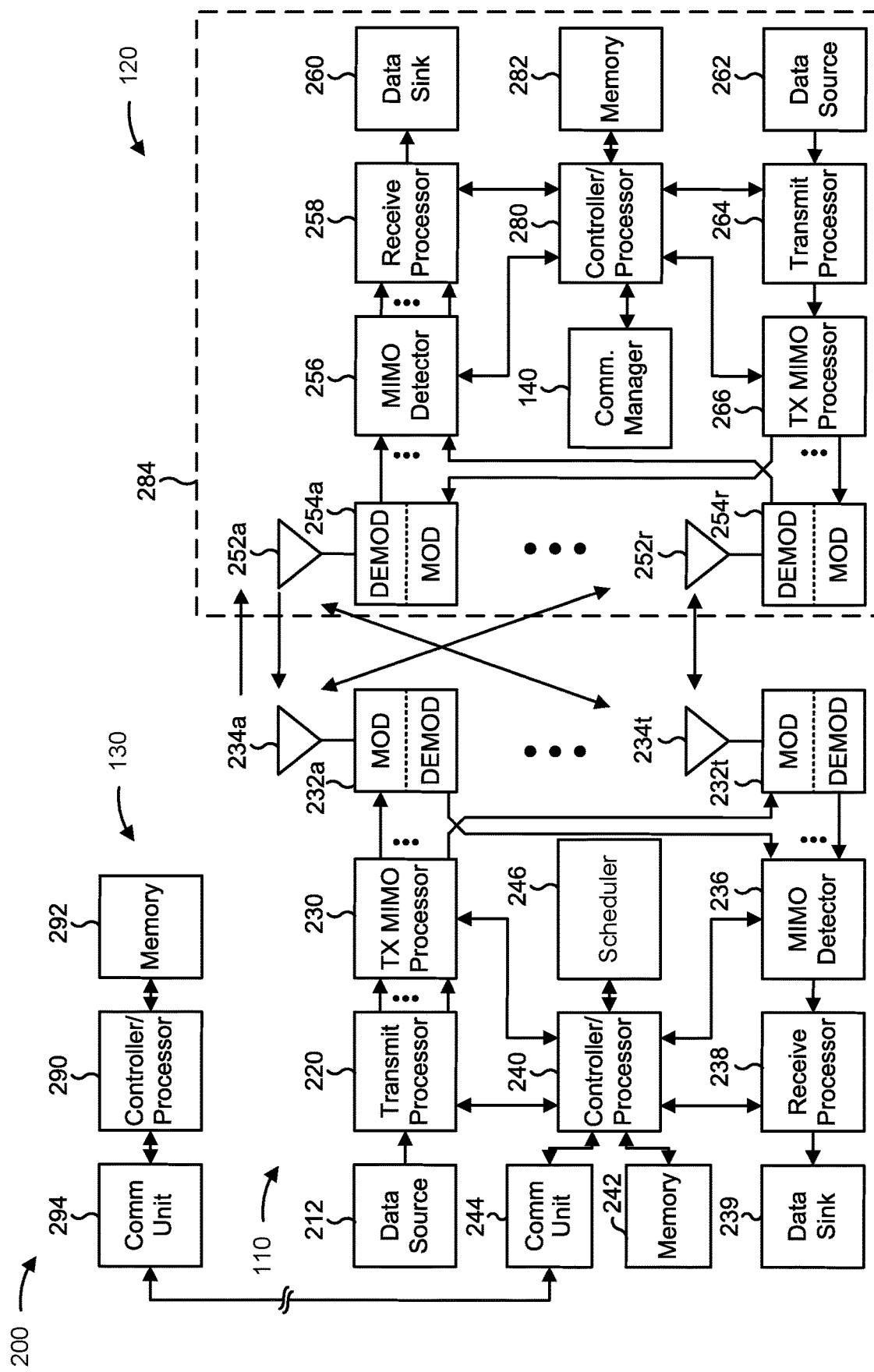
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIG. 4, FIGS. 5A-5D, and/or FIGS. 6-7).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIG. 4, FIGS. 5A-5D, and/or FIGS. 6-7).

The controller/processor 240 of the base station 110, the controller/processor 280 of the UE 120, and/or any other component(s) of FIG. 2 may perform one or more techniques associated with aircraft beam muting for multi-aircraft emergency message relaying, as described in more detail elsewhere herein. In some aspects, the aerial node described herein is the UE 120, is included in the UE 120, or includes one or more components of the UE 120 shown in FIG. 2. For example, the controller/processor 240 of the base station 110, the controller/processor 280 of the UE 120, and/or any other component(s) of FIG. 2 may perform or direct operations of, for example, process 600 of FIG. 6 and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6 and/or other processes as described herein. In some examples, executing instructions may include running the instructions, converting the instructions, compiling the instructions, and/or interpreting the instructions, among other examples.

In some aspects, the aerial node includes means for determining, among a set of beams, one or more beams to be muted to mitigate potential interference associated with multiple aerial nodes transmitting to a terrestrial UE 120; and/or means for muting the one or more beams while transmitting, to the terrestrial UE, at least one of a discovery signal or feedback related to an emergency message relaying service. In some aspects, the means for the aerial node to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
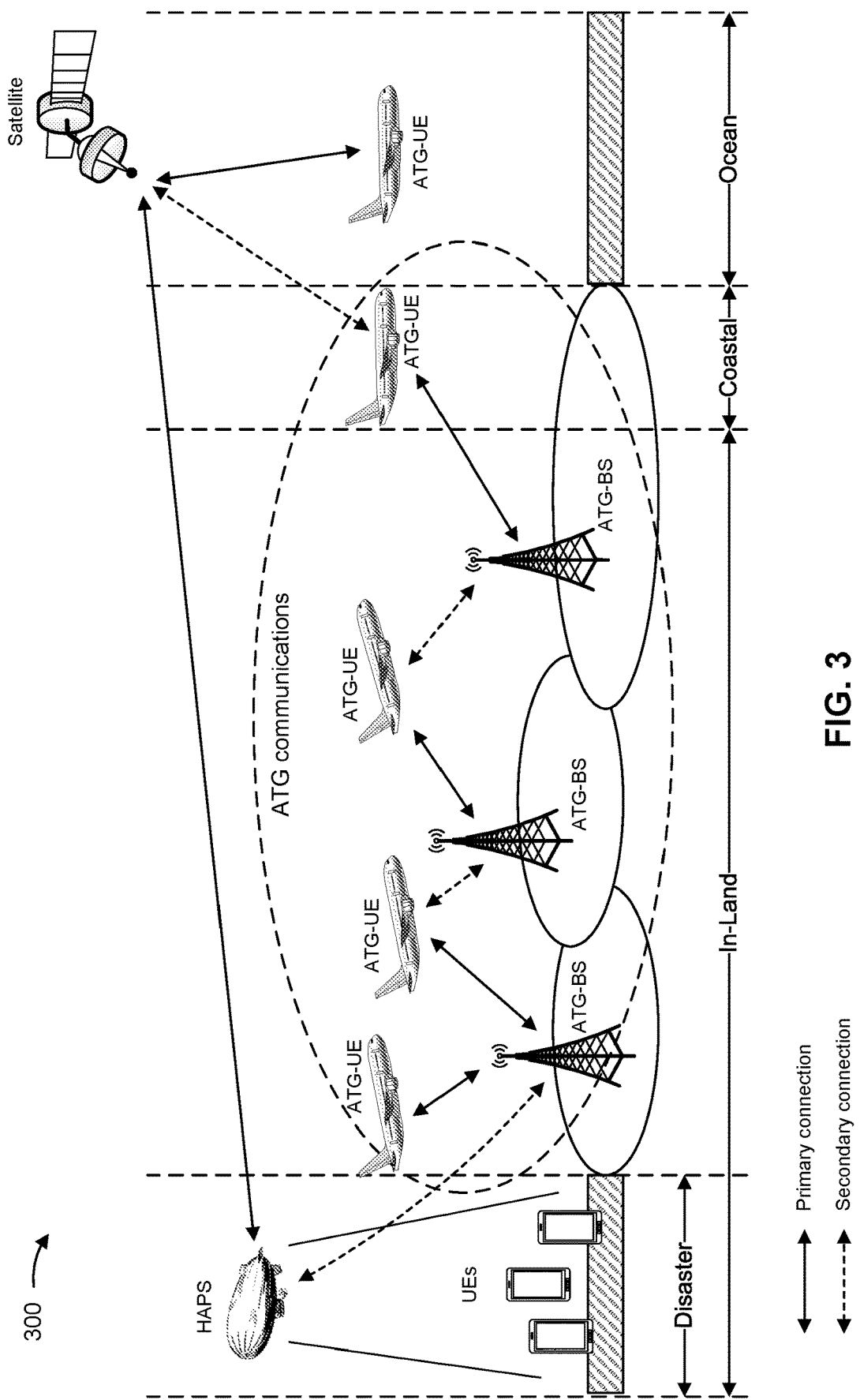
FIG. 3 is a diagram illustrating an example of air-to-ground (ATG) communications, in accordance with the present disclosure.

FIG. 3 is a diagram illustrating an example of air-to-ground (ATG) communications, in accordance with the present disclosure.

As shown in FIG. 3, an ATG network may include one or more ATG UEs and one or more ATG base stations. Each ATG-UE may be, may include, or may be included in an onboard terminal and/or customer premises equipment (CPE) on an aerial node, which may be an aircraft (e.g., an airplane), an unmanned aerial vehicle (UAV), a high altitude platform station (HAPS), or another suitable manned or unmanned aerial device. The ATG UE may include one or more components of the UE 120 described elsewhere herein. Accordingly, as used herein, the term "aerial node" may refer to an ATG-UE, one or more components of an ATG- UE, or an aircraft that includes an ATG-UE (e.g., an aircraft, UAV, HAPS, or the like). Each ATG base station (shown as an ATG-BS) may be a terrestrial ground-based base station (e.g., a 5G/NR gNB) that transmits signals to and receives signals from the ATG-UEs. Each ATG-BS may include one or more components of the base station described elsewhere herein. In some aspects, a cell associated with an ATG-BS may have an extremely large coverage range, such as up to 300 kilometers (km). In some cases, ATG communication between the ATG-UEs and ATG-BSs may use the same frequency band as terrestrial UEs and terrestrial base stations in terrestrial networks. For example, as used herein, the term "terrestrial UE" may refer to any suitable UE on the ground that is not an ATG-UE, and the term "terrestrial base station" may refer to any cellular base station that is not an ATG-BS. In some aspects, an ATG-UE may be more powerful than a terrestrial UE. For example, an ATG-UE may transmit with a higher effective isotropic radiated power (EIRP) than a terrestrial UE, via a larger transmission power and/or a larger on-board antenna gain.

Accordingly, as described herein, ATG communications may generally allow ATG-BSs on the ground to communicate with aircraft and airborne devices (e.g., UEs carried by passengers on the aircraft) connected to a CPE associated with the aircraft. For example, in an ATG network, the ATG-BSs on the ground may equipped with up-tilting antennas to communicate with the ATG-UEs, and the ATG-UEs in the air may communicate with the ATG-BSs using one or more antennas that are located at an aircraft bottom and/or one or more antennas that are located on the side of the aircraft (e.g., an ATG-4 antenna configuration may include two antennas on the aircraft bottom and one antenna on each side of the aircraft). In some aspects, the aircraft may include CPE, such as an on-board server and one or more wireless local area network (WLAN) antennas, to communicate with other airborne devices connected to or traveling on the aircraft. ATG communications may support various traffic types, such as in-flight passenger communications (e.g., in-flight connectivity, en-route passenger communications, takeoff/landing communications climb/descent communications, or the like during commercial flights and/or business aviation flights), airline operation communications (e.g., aircraft surveillance and maintenance, flight planning, and/or weather), and/or air traffic control communications (e.g., using ATG communications to serve as a back-up to systems in aviation licensed bands).

As shown in FIG. 3, an ATG network may be deployed in-land (e.g., which may include disaster areas) and/or in coastal areas. As further shown, an ATG network may serve as a primary connection or a secondary connection for an aerial node. For example, in FIG. 3, an ATG-UE provided on an aircraft or aerial node (e.g., traveling at an altitude up to about 13 km) may have a primary connection to a first ATG-BS and a secondary connection to a second ATG-BS based on a direction in which the aerial node is traveling. Additionally, or alternatively, one or more ATG-UEs may have a primary connection to an ATG-BS and a secondary connection to a satellite (e.g., while traveling over coastal areas), or a primary connection to a satellite and no connection to an ATG-BS (e.g., while traveling over the ocean). Additionally, or alternatively, as shown in FIG. 3, a HAPS (e.g., an aerial node traveling at an altitude between about 13 km and about 22 km) that communicates with terrestrial UEs in a disaster area may have a primary connection to a satellite and a secondary connection to an ATG-BS. ATG communications may provide various advantages over satellite communications, such as lower cost, higher throughput, and lower latency.

As indicated above, FIG. 3 is provided as an example. Other examples may differ from what is described with regard to FIG. 3.

Figure 4:
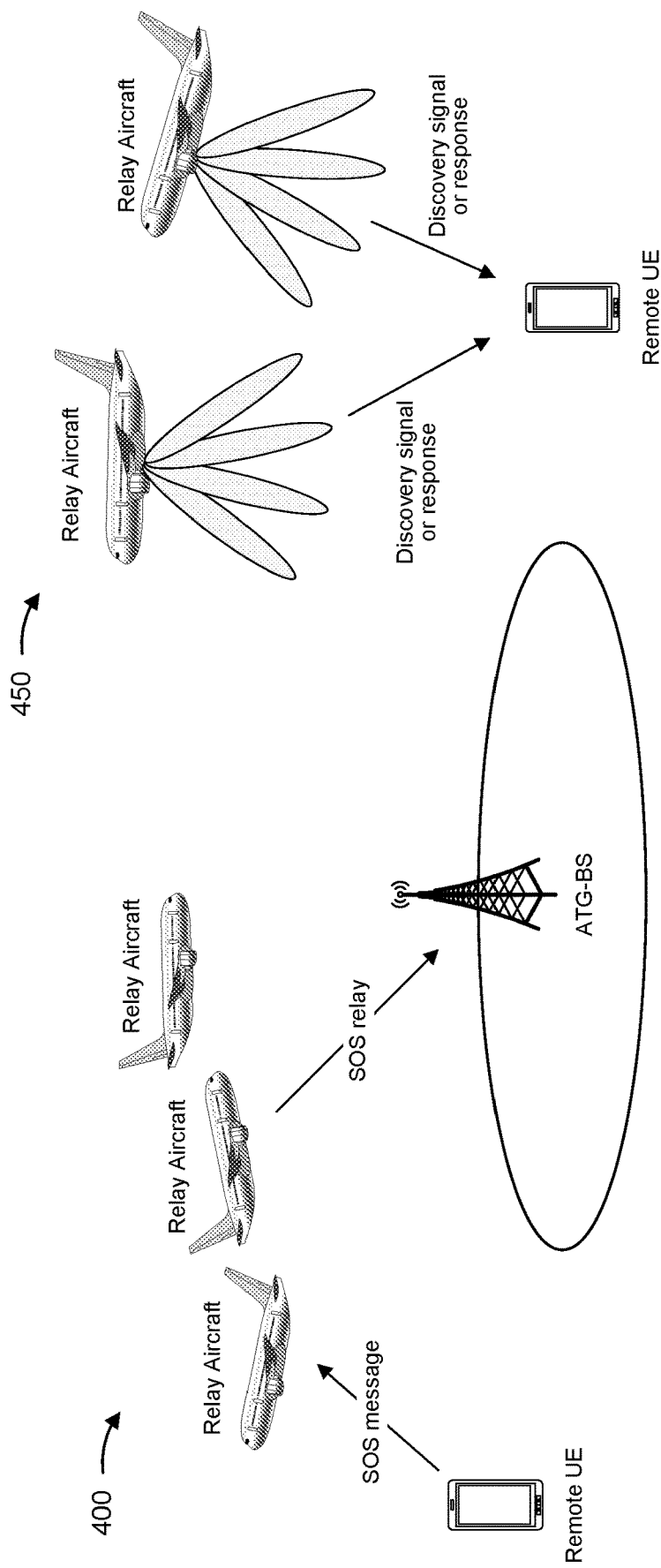
FIG. 4 is a diagram illustrating examples related to using ATG communications to relay emergency messages for an out-of-coverage terrestrial UE, in accordance with the present disclosure.

FIG. 4 is a diagram illustrating examples 400, 450 related to using ATG communications to relay emergency messages for an out-of-coverage terrestrial UE, in accordance with the present disclosure.

As described herein, ATG communications may occur between one or more ATG-BSs that are located on the ground and one or more aircraft that are traveling in the air in order to support various traffic types, such as in-flight passenger communications, airline operation communications, and/or air traffic control. Furthermore, another potential use case for ATG communications may include relaying emergency messages, sometimes referred to as SOS messages, SOS distress signals, or the like, for terrestrial UEs that are in an out-of-coverage area (e.g., in a disaster area where terrestrial cellular communications are disrupted and/or a remote location where no terrestrial cellular base stations are deployed), as ATG communications may offer various advantages over existing techniques to deliver emergency messages from terrestrial UEs. For example, one existing approach to delivering emergency messages is to use a satellite service in which a mobile satellite phone, sometimes referred to as a satphone, connects to other phones or a telephone network through orbiting satellites (e.g., rather than terrestrial cellular sites). Although satellite phones can be used to communicate with satellites that are already in operation, which can reduce a time to market and/or reduce deployment costs, satellite phones are associated with drawbacks such as strict antenna and transmit power requirements that require skillful human-assisted operation to point the antenna toward the satellite to avoid blockages. Furthermore, satellite phones often lack a capability to transmit MTC-like messages and the strict hardware requirements are often incompatible with contemporary mobile device form factors.

Accordingly, one potential alternative to a satellite service is to deliver emergency messages through a non-terrestrial network (NTN), where a terrestrial UE on the ground communicates with a satellite in a regenerative NTN deployment or a satellite in a transparent NTN deployment. For example, in a regenerative NTN deployment, a terrestrial UE is served by a satellite via a service link, and the satellite includes a base station or a gNB configured to provide a cell that covers the terrestrial UE. Alternatively, in a transparent NTN deployment, sometimes referred to as a bent-pipe NTN deployment, a terrestrial UE communicates with a satellite via a service link, and the satellite communicates with a gateway via a feeder link in order to relay communications between the terrestrial UE and the gateway. In general, using an NTN to deliver emergency messages transmitted by terrestrial UEs may potentially solve some or all of the drawbacks of satellite phones, such as the strict antenna and transmit power requirements that require skilled human-assisted operation. However, an NTN carries a very high deployment cost (e.g., to launch satellites and deploy gateways), which may limit widespread deployment of NTNs.

Accordingly, in some aspects described herein, ATG communications may be used to deliver emergency messages in order to address the drawbacks associated with satellite phones and/or NTN communications. For example, existing ATG networks have already been deployed in various regions, there is ongoing ATG network deployment to increase the areas where ATG communications are enabled, and modified aircraft designs to support ATG communications have already been developed and approved by certain aviation authorities. Furthermore, there are current and ongoing efforts to develop wireless communication standards to define ATG communication protocols, including ATG spectrum requirements and/or techniques to enable coexistence between ATG and terrestrial cellular networks. Accordingly, based on current trends, global inter-operable ATG networks are expected to be widely deployed, whereby some aspects described herein may use commercial aircraft and/or other aerial nodes to provide an emergency message relaying service to extend coverage to terrestrial UEs that are out-of-coverage (e.g., in an area without a terrestrial base station and/or an area where terrestrial base stations are not operating due to a disaster, a network outage, or other circumstances). For example, as shown in FIG. 4, an aerial node offering an emergency message relaying service may transmit a discovery signal toward terrestrial UEs that are located on the ground (e.g., to indicate availability of the emergency message relaying service), may use best efforts to relay an emergency message received from a terrestrial UE to an ATG-BS, and/or may transmit feedback related to the relaying of the emergency message to the terrestrial UE.

In this way, at a typical cruising altitude of approximately 10 km, using aircraft or other aerial nodes and ATG communications enable an emergency message relaying service via line-of-sight (LOS) propagation for over 200 km. Furthermore, although the density of commercial aircraft may vary from one region to another, commercial aircraft traffic is generally fairly dense at least during daylight hours, whereby at least one aircraft will usually be within 50-100 km of a terrestrial UE in most remote out-of-coverage areas. Relative to a satellite phone service, ATG communications may require less human assistance to operate the terrestrial UE used to send the emergency message and provide the ability to send emergency messages using MTC or MTC-like communications. Furthermore, relative to an NTN, ATG communications may avoid a need to launch new satellites, which reduces deployment costs and enables ATG-based emergency message relaying services to be deployed more rapidly because only software upgrades are needed to configure an ATG CPE to relay emergency messages. However, despite the numerous benefits of using ATG communications to relay emergency messages, ATG communications pose challenges such as interference experienced at a terrestrial UE in cases where multiple aerial nodes transmit to the terrestrial UE at the same time or using the same resources.

For example, because aircraft density may be high depending on the region and/or time-of-day, there are many scenarios where multiple aircraft cover the same out-of-coverage area or intersecting out-of-coverage areas. For example, example 450 depicts a scenario where there are two relay aircrafts associated with intersecting ground coverage areas, which may cause interference to be experienced at a terrestrial UE when both aircrafts transmit to the terrestrial UE at the same time and/or using the same communication resources. For example, an ATG-based emergency message relaying service may be enabled via aircraft-initiated discovery, where aircraft use one or more transmit beams to transmit a wakeup signal, a synchronization signal block, or another suitable discovery signal to indicate a capability to relay emergency messages for out-of-coverage terrestrial UEs. Additionally, or alternatively, an ATG-based emergency message relaying service may be enabled via UE-initiated discovery, where an out-of-coverage terrestrial UE transmits a discovery signal or an emergency message and aircraft that detects the discovery signal sends feedback to the terrestrial UE (e.g., acknowledging the transmission of the discovery signal or emergency message by the terrestrial UE). Accordingly, one or more aircraft may be configured to mute one or more beams in order to mitigate potential interference that may otherwise be caused at a terrestrial UE when multiple aircraft transmit discovery signals or feedback related to an emergency message relaying service to the terrestrial UE at the same time and/or using the same communication resources. In particular, as described herein, an aircraft may mute a beam by disabling or configuring one or more components in a transmit chain such that no signal is transmitted in a direction associated with the beam (e.g., one or more antennas are configured to not transmit a signal in the direction associated with the beam or the transmit chain is configured to produce destructive interference such that no signal is transmitted in the direction associated with the beam).

However, determining which beams to mute and/or when to mute one or more beams poses further challenges, because aircraft trajectories may intersect and errors in an estimated global navigation satellite system (GNSS) position of an aircraft may result in complex and/or frequent changes to on/off beam control managed by an ATG-BS. For example, to meet performance-based navigation (PBN) requirements, an aircraft must satisfy an area navigation (RNAV) requirement and/or a required navigation performance (RNP) for a certain percentage of a total flight time. For example, an RNAV 1 requirement that applies to a departure procedure (DP) and/or a standard terminal arrival (STAR) specifies that an aircraft must maintain a total system error (TSE) below one nautical mile (or 1.8 km) for 95% of the total flight time, and an RNAV 2 requirement applicable en-route specifies that an aircraft must maintain a TSE below two nautical miles (or 3.6 km) for 95% of the total flight time. Alternatively, in cases where the aircraft is subject to RNP only, the aircraft may be required to maintain a TSE below two nautical miles for 99.999% of the total flight time. In general, the TSE may be determined as a sum of a navigation system error (NSE) (e.g., defining a maximum difference between an estimated position and a true position of an aircraft), a flight technical error (FTE) (e.g., a distance between the estimated position of the aircraft and a defined path for the aircraft), and a path definition error (PDE) (e.g., a distance between the defined path of the aircraft and a desired path of the aircraft). Signaling to communicate an aircraft position report is therefore needed in an ATG network because the NSE, the FTE, and/or the PDE can result in a navigation route having a kilometer-level TSE, which can lead to difficulties in determining the interference that may be caused at a terrestrial UE at any particular time and/or location.

Accordingly, as described herein, there may be potential interference at a terrestrial UE in a dense aircraft scenario where multiple aerial nodes have a common or intersecting coverage area on the ground (e.g., due to the multiple aerial nodes transmitting discovery signals and/or feedback related to an emergency message relaying service within the common or intersecting coverage area). One way to mitigate the potential interference may be for the aerial nodes to perform beam switching for the beam(s) used to transmit the discovery signals or feedback related to the emergency message relaying service. However, performing beam switching for the out-of-coverage terrestrial UE while relaying emergency messages for the out-of-coverage terrestrial UE may be impractical (e.g., because emergency messages are one-shot ultra-short messages transmitted without a radio resource control (RRC) connection). For example, assuming that an aircraft is traveling at a speed around 250 meters per second with a ground coverage area defined as a circle with a diameter of 50 km, the maximum serving time for a terrestrial UE by one aircraft is about 400 seconds.

In some aspects, aircraft beam muting may therefore be used to mitigate the potential interference at a terrestrial UE when multiple aerial nodes are providing an emergency message relaying service in a dense aircraft scenario. For example, when multiple aerial nodes have a common or intersecting ground coverage, one potential approach may be to use coordination techniques that may be similar to inter-cell and/or inter-UE coordination procedures performed in an IAB network or another suitable wireless network to enable transmissions by only one aircraft within a common coverage area and/or configure different aircraft to transmit using different resources. However, determining which aircraft to enable and/or which transmission resources to configure may be challenging due to aircrafts having a very high mobility. Accordingly, as described in further detail herein with reference to FIGS. 5A-5D, one or more dynamic aircraft beam muting techniques may be used to avoid or otherwise mitigate interference caused by multiple aerial nodes transmitting discovery signals or feedback to out-of-coverage terrestrial UEs. In this way, out-of-coverage terrestrial UEs may receive and decode the discovery signals or feedback related to the emergency message relaying service more reliably.

As indicated above, FIG. 4 is provided as an example. Other examples may differ from what is described with regard to FIG. 4.

Figure 5A:
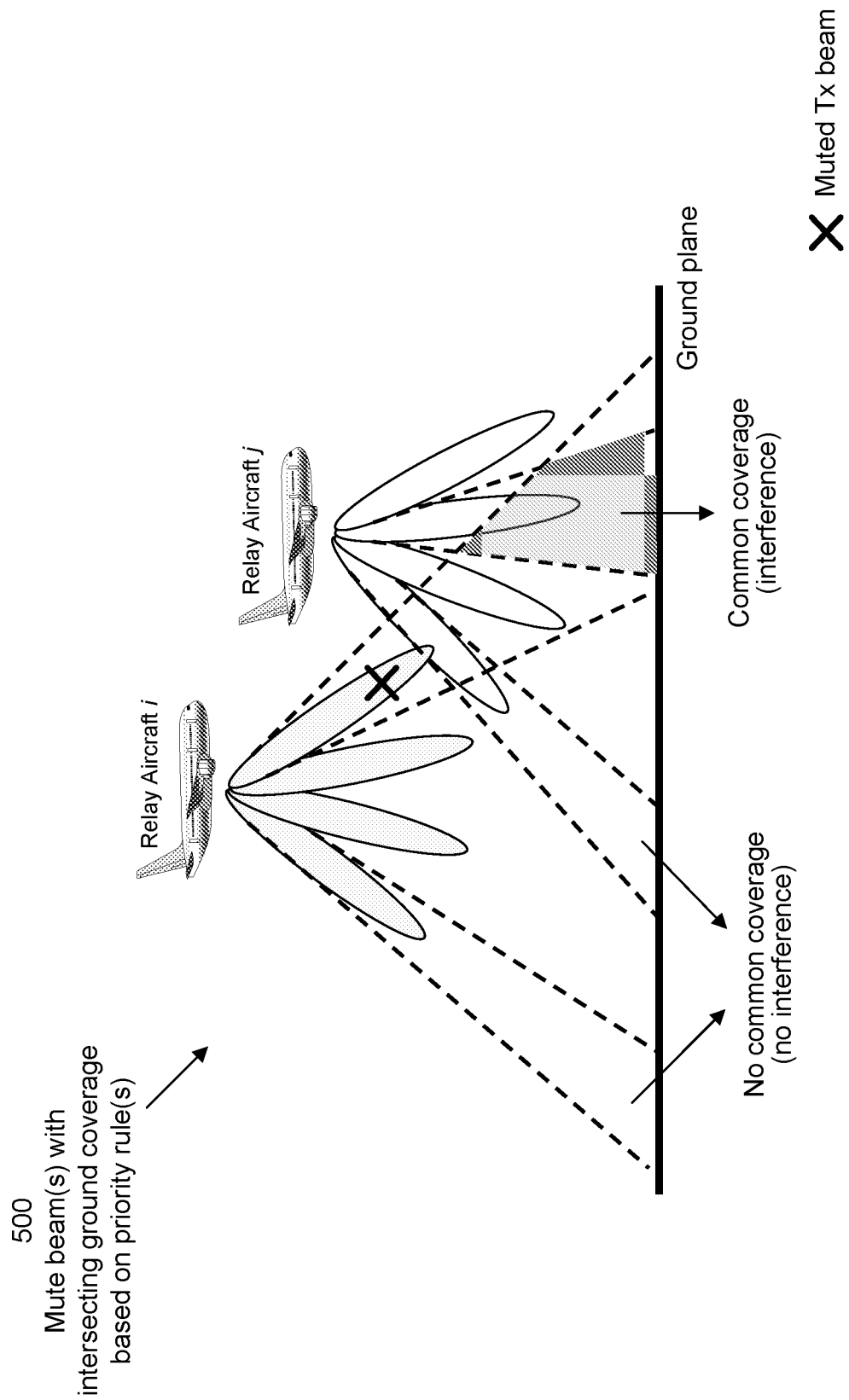
Figure 5B:
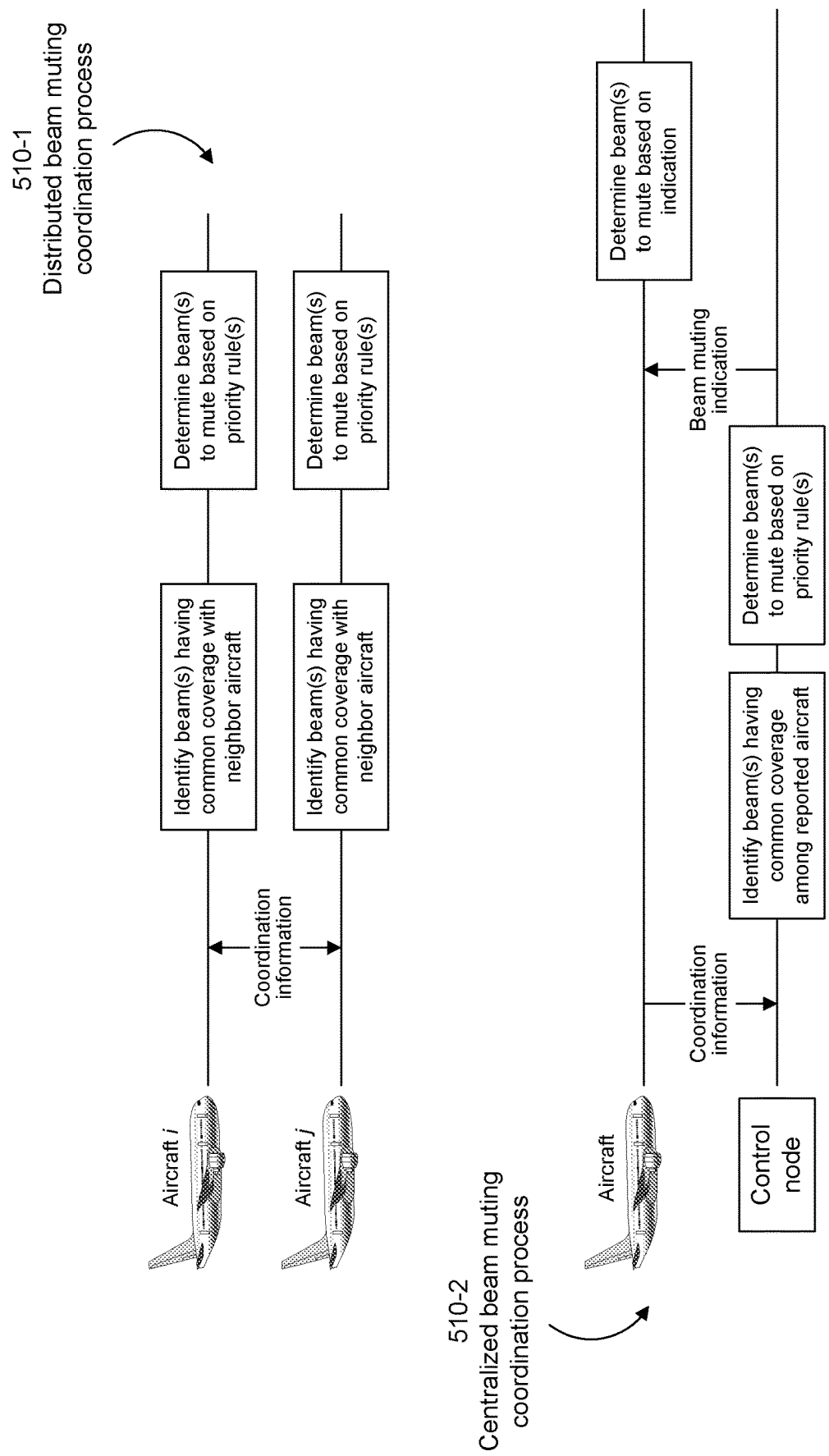
Figure 5C:
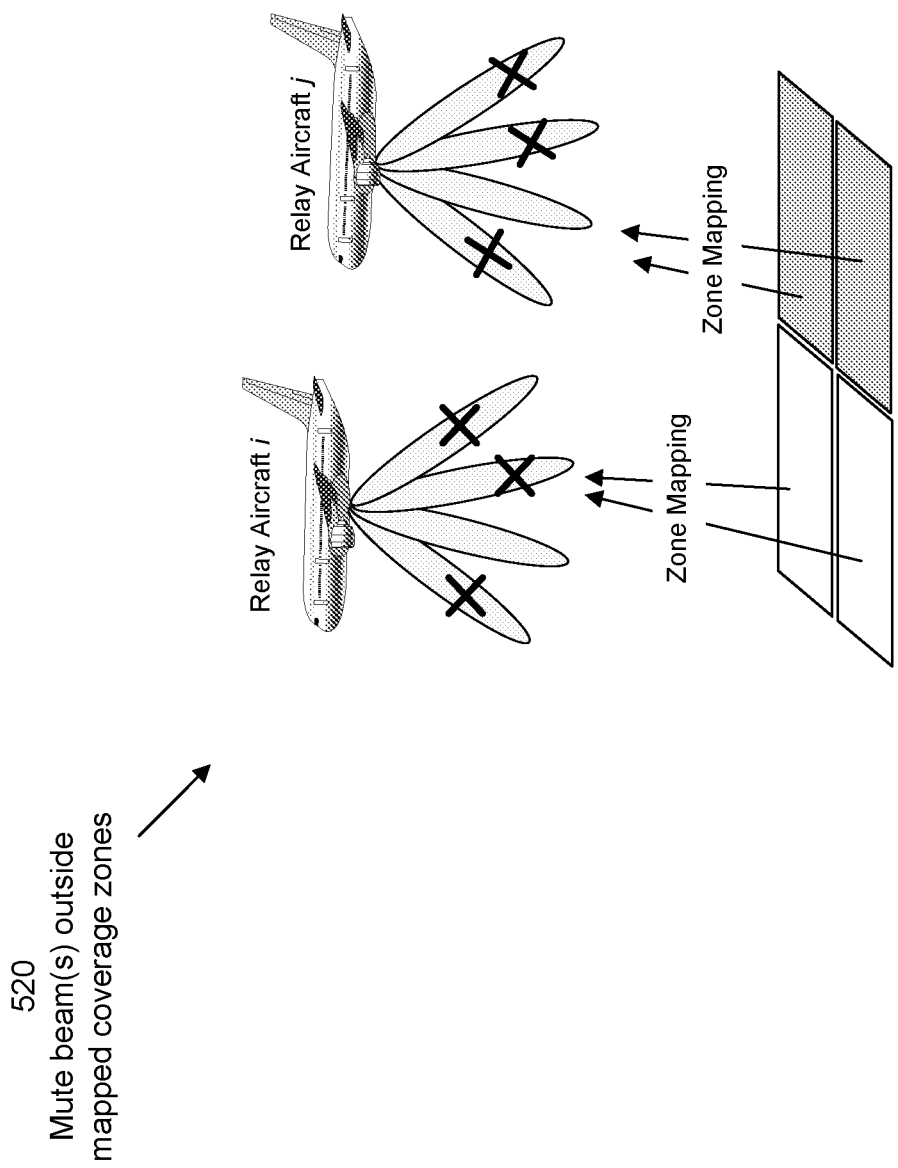

FIGS. 5A-5D are diagrams illustrating various examples associated with aircraft beam muting for multi-aircraft emergency message relaying, in accordance with the present disclosure. For example, as described in further detail herein, FIG. 5A illustrates an example 500 where an aerial node providing an emergency message relaying service mutes only one or more beams that have a common or intersecting ground coverage area with one or more beams of another (neighboring) aerial node, FIG. 5B illustrates examples 510-1, 510-2 of beam muting coordination processes that may be used to determine which beam(s) are to be muted within the common or intersecting ground coverage area, FIG. 5C illustrates an example 520 where an aerial node providing an emergency message relaying service mutes any beams that are directed toward ground coverage zones that are outside one or more ground coverage zones mapped to the aerial node, and FIG. 5D illustrates an example 530 where one aerial node is selected to exclusively perform UE-directed transmission behavior related to an emergency message relaying service and all other aircrafts in the area mute all of their transmission beams.

In some aspects, as described herein, the various examples shown in FIGS. 5A-5D may be applicable to scenarios where multiple aerial nodes in an ATG network are providing an emergency message relaying service and the multiple aerial nodes (shown as relay aircraft in FIGS. 5A-5D) transmit discovery signals or feedback related to the emergency message relaying service to out-of-coverage terrestrial UEs (not explicitly shown in FIGS. 5A-5D). In particular, it will be appreciated that an out-of-coverage terrestrial UE may not experience interference when there are multiple aircraft receiving emergency message transmissions from the terrestrial UE, nor will the out-of-coverage terrestrial UE experience interference when there is only one aircraft transmitting discovery signals or feedback related to the emergency message relaying service.

In some aspects, as shown in FIG. 5A, and by example 500, one or more aerial nodes may mute one or more beams associated with a ground coverage area that is common or otherwise intersecting with a ground coverage area of a beam associated with another aerial node. For example, in example 500, a first aerial node (shown as relay aircraft i) includes a first set of beams and a second aerial node (shown as relay aircraft j) and includes a second set of beams, where the first set of beams and the second set of beams each include one or more beams associated with a common or intersecting ground coverage area. In this case, as described herein, one or more of the aerial nodes may mute one or more of the beams associated with the common or intersecting ground coverage area such that only one aerial node is transmitting discovery signals or feedback related to the emergency message relaying service within the common or intersecting ground coverage area. Furthermore, because a terrestrial UE does not experience interference when there is only one aerial node transmitting to the terrestrial UE, the aerial nodes do not mute any beams associated with a ground coverage area that does not intersect with beams of any neighboring aerial node. For example, when there are multiple neighboring aerial nodes in a given area or region, some of the beams of the different aerial nodes may intersect in their coverage on the ground and other beams of the different aerial nodes do not intersect. Accordingly, in example 500, the aerial nodes providing the emergency message relaying service only need to mute beams that may potentially cause interference at a terrestrial UE, where such beams are those that have common or intersecting ground coverage areas. In this way, muting only the beams that have common or intersecting ground coverage areas may provide a large coverage area for the discovery signals or feedback transmitted using the other beams that do not cause potential interference at a terrestrial UE.

In some aspects, as described herein, the determination regarding which beam(s) to mute within common or intersecting ground coverage areas may be highly dynamic due to high mobility of the aerial nodes that providing the emergency message relaying service. Accordingly, in some aspects, various techniques may be used to determine whether there may be potential interference at a terrestrial UE, and if so, to further determine which beams are to be muted to mitigate the potential interference. For example, in some aspects, a control node (e.g., an ATG-BS, a satellite, and/or an aerial node designated as an aircraft leader) may analyze planned trajectories (e.g., based on aircraft routes) for different aerial nodes to determine when and where beams of different aerial nodes are predicted to have intersecting ground coverage areas. The control node may then transmit, to the aerial nodes during flights of the aerial nodes, information related to time and location-based triggers where one or more beams are to be muted. For example, in a case where a first beam of a first aerial node and a second beam of a second aerial node are predicted to have an intersecting ground coverage area for a particular time period, the control node may determine the projected locations of the respective aerial nodes during the time period when the first beam and the second beam are predicted to have the intersecting ground coverage area. The control node may then configure a time and location-based trigger to mute either the first beam or the second beam during the time period when and in the projected locations where the first beam and the second beam are predicted to have the intersecting ground coverage area.

For example, in some aspects, the control node may determine which beam(s) to mute (such that there is only one aerial node performing transmit behavior toward terrestrial UEs within any given coverage area on the ground) based on one or more beam priority rules. For example, in some aspects, the one or more beam priority rules may specify that, when a first beam associated with a first aerial node and a second beam associated with a second aerial node have an intersecting ground coverage area, the beam associated with the aerial node that has a lower altitude has a higher priority (e.g., the beam associated with the aerial node that has a higher altitude is muted). In this way, the wireless channel from the aerial node with the lower altitude may have the smallest impact from atmospheric absorption or attenuation. Additionally, or alternatively, the one or more beam priority rules may specify that, when a first beam associated with a first aerial node and a second beam associated with a second aerial node have an intersecting ground coverage area, the beam associated with the aerial node with a shorter line-of-sight path or a lower pathloss to the ground has a higher priority (e.g., the beam that has the longer line-of-sight path or higher pathloss is muted). In this way, the terrestrial UE may receive the discovery signal or feedback transmitted with the unmuted beam with a maximum RSRP. Additionally, or alternatively, the one or more beam priority rules may specify that, when a first beam associated with a first aerial node and a second beam associated with a second aerial node have an intersecting ground coverage area, the beam associated with the aerial node with a lower velocity has a higher priority (e.g., the beam associated with the aerial node with the higher velocity is muted). In this way, a Doppler shift of the discovery signal or feedback transmitted with the unmuted beam may be reduced, which may improve decoding performance for the receiving terrestrial UE. Additionally, or alternatively, the one or more beam priority rules may specify that, when a first beam associated with a first aerial node and a second beam associated with a second aerial node have an intersecting ground coverage area, the beam associated with the aerial node with a lower turbulence state has a higher priority (e.g., the beam associated with the aerial node with the higher turbulence state is muted). In this way, the discovery signal or feedback transmitted with the unmuted beam may have a maximum stability, which may improve decoding performance for the receiving terrestrial UE.

Furthermore, as described herein, the aerial nodes in an ATG network may be associated with significant positioning errors, where a true position of an aerial node at any given time can deviate from a planned trajectory of the aerial node by up to 3.6 km (e.g., because an aircraft can have a TSE up to two (2) nautical miles and still satisfy any applicable PBN, RNAV, and/or RNP parameters). Accordingly, in addition to the control node configuring time/location-based triggers to define when and where an aerial node is to mute one or more beams and which beam(s) to mute during such times and locations, the beams to be muted may be determined or modified during a beam muting coordination process that may be triggered when one or more conditions are satisfied. For example, as shown in FIG. 5B, and by example 510-1, aerial nodes may communicate during a distributed beam muting coordination process to determine whether the aerial nodes include beams with intersecting ground coverage areas and which beams of the intersecting beams are to be muted based on real-time coordination information related to a kinematic state of the aerial nodes. Additionally, or alternatively, example 510-2 illustrates a centralized beam muting coordination process in which multiple aerial nodes communicate with a control node that then determines whether the aerial nodes include beams with intersecting ground coverage areas and which beams of the intersecting beams are to be muted.

For example, in some aspects, the distributed and/or centralized beam muting coordination process may be triggered when one or more conditions related to real-time positions of the aerial nodes indicates a need to improve the accuracy of the time/location-based triggers that are based on the planned trajectories of the aerial nodes. For example, in some aspects, the distributed and/or centralized beam muting coordination process may be triggered based on the control node (e.g., an ATG-BS, a satellite, or an aircraft leader) calculating distances between aerial nodes that are in the same three-dimensional zone (e.g., the same airspace) based on a real-time position report indicating the three-dimensional positions of the aerial nodes and determining that the distances among at least one pair of aerial nodes satisfies (e.g., is below) a threshold. In this case, the control node may inform the aerial nodes that the condition is satisfied, which may trigger the distributed and/or centralized beam muting coordination process. Additionally, or alternatively, the distributed and/or centralized beam muting coordination process may be triggered based on a first aerial node receiving a signal (e.g., an inter-aircraft discovery signal, a sounding signal, or another suitable signal) from a second aerial node with an RSRP that satisfies (e.g., equals and/or exceeds) a threshold. Additionally, or alternatively, the beam muting coordination process may be triggered based on a first aerial node detecting a second aerial node with radar equipped on the first aerial node and determining that the distance between the first aerial node and the second aerial node satisfies (e.g., is below) a threshold. Additionally, or alternatively, the beam muting coordination process may be triggered in cases where multiple aerial nodes are covered by the same satellite beam, which may be determined by inter-aircraft communication indicating which satellite beam covers each aerial node and/or the satellite transmitting an appropriate indication to aerial nodes that are communicating with the satellite using the same beam.

In some aspects, as shown by example 510-1 and example 510-2, the determination of whether there are two or more beams with intersecting ground coverage areas and/or which beams are to be muted may be based on coordination information that is provided by one or more aerial nodes. For example, in some aspects, the coordination information may include information related to a kinematic state of the aerial node providing the coordination information, where a kinematic state generally refers to information that describes a position, an orientation, and/or a state of motion. For example, the coordination information that is provided by an aerial node during the distributed and/or centralized beam muting coordination process may include a position of the aerial node, an orientation or attitude angle of the aerial node (e.g., about pitch, roll, and yaw axes), a direction in which the aerial node is traveling, a speed or velocity at which the aerial node is traveling, and/or a turbulence state associated with the aerial node, among other examples.

Accordingly, in the distributed beam muting coordination process shown by example 510-1, a first aerial node (shown as relay aircraft i) may transmit coordination information to a second aerial node (shown as relay aircraft i) (e.g., as sidelink control information via a PC5 interface when the distributed beam muting coordination process is configured like inter-UE sidelink coordination, or as downlink control information via a Uu interface when the distributed beam muting coordination process is configured like inter-cell coordination). The second aerial node may then identify any beams of the second aerial node that have an intersecting coverage area with one or more beams of the first aerial node, and the second aerial node may determine one or more beams of the second aerial node to be muted based on the priority rules described herein (e.g., muting the intersecting beam of the second aerial node if the second aerial node has a higher altitude, a longer line-of-sight path, a higher pathloss, a higher velocity, and/or a higher turbulence state than the first aerial node). Furthermore, in the distributed beam muting coordination process, a similar determination may be made by the first aerial node based on coordination information provided by the second aerial node.

Additionally, or alternatively, in the centralized beam muting coordination process shown by example 510-2, a control node may determine which aircraft beams are to be muted based on coordination information provided by multiple aerial nodes. For example, as shown, different aerial nodes may transmit coordination information to the control node (e.g., via a PC5 interface or a Uu interface when the control node is an aircraft leader and the coordinated aerial nodes are configured like UEs or IAB nodes, or via a Uu interface when the control node is an ATG-BS or a satellite). Accordingly, in the centralized beam muting coordination process, the control node may identify beams of different aerial nodes that have intersecting coverage areas among the aerial nodes that have reported coordination information to the control node, and the control node may determine one or more beams to be muted per aerial node based on the priority rules described herein (e.g., among multiple beams with intersecting ground coverage areas, muting all intersecting beams except for a beam of an aerial node with a lowest altitude, a shortest line-of-sight path, a lowest pathloss, a lowest velocity, and/or a lowest turbulence state node). Accordingly, the control node may transmit an indication to each aerial node to indicate which beams are to be muted, and the aerial node receiving the indication may then mute the indicated beam(s).

In general, as described herein, muting only the beams that are associated with intersecting ground coverage areas may provide a large coverage area for the discovery signals and/or feedback that aerial nodes transmit to terrestrial UEs to enable the emergency message relaying service (e.g., by enabling transmission via all beams that do not intersect with a beam of another aerial node). However, due to the kilometer-level positioning errors and high mobility of the aerial nodes in an ATG network, determining whether, when, and/or where to mute intersecting beams and determining which intersecting beam(s) to mute is highly dynamic and subject to complex decision rules (e.g., using triggers based on planned trajectories and additional coordination processes to improve accuracy due to aircraft mobility and/or positioning errors). Furthermore, when the distributed and/or centralized beam muting coordination processes are used, the beam muting coordination processes introduce additional signaling and indication that can lead to congestion, interference, or other adverse conditions. Accordingly, some aspects described herein may simplify the techniques used to determine whether to mute one or more beams and/or which beams to mute.

For example, referring to FIG. 5C, example 520 relates to an aircraft beam muting configuration in which a ground zone identifier mapping is used to assist an aerial node in determining which beam(s) to mute. In particular, each aerial node in an ATG network may be mapped to one or more ground zone identifiers, where each ground zone identifier may correspond to an area that is outside cellular coverage (e.g., such that any terrestrial UEs in the area will be out-of-coverage). Additionally, or alternatively, the ground zone identifiers may correspond to areas associated with poor cellular coverage (e.g., LTE coverage only, poor NR coverage, or the like) and/or may overlap with one or more cellular coverage areas. In any case, each aerial node may be mapped to one or more ground zones, and each aerial node may mute any beams that are directed outside the one or more ground zones mapped to the aerial node. In some aspects, the mapping between an aerial node and one or more ground zones may be performed via inter-aircraft coordination (e.g., where each aerial node indicates a position or provides other coordination information to neighboring aerial nodes via a Uu or PC5 interface, and each aerial node calculates the mapping locally using one or more configured algorithms). Additionally, or alternatively, the mapping between aerial nodes and ground zones may be controlled by a control node (e.g., an ATG-BS, satellite, or aircraft leader), where different aerial nodes indicate their positions or provide other coordination information to the control node, which then calculates the ground zone mapping for each aerial node and indicates the calculated ground zone mapping to each respective aerial node. Additionally, or alternatively, an initial ground zone mapping may be configured based on predictions based on planned trajectories of the aerial nodes, and the initial ground zone mapping may be dynamically updated according to aircraft position reports in a similar manner as described herein. In this way, the ground zone mapping may ensure that only one aerial node is performing transmit UE-directed behavior (e.g., transmitting discovery signals or feedback) related to the emergency message relaying service within any one ground zone. Furthermore, using the ground zone mapping to determine which beams to mute and which beams to use for UE-directed transmissions may have a lower complexity and less signaling than dynamically muting only the beams that have intersecting ground coverage areas.

Additionally, or alternatively, referring to FIG. 5D, example 530 relates to an aircraft beam muting configuration in which one aerial node may be configured to exclusively perform UE-directed transmit behavior related to an emergency message relaying service within a given area, and any other aerial nodes in the vicinity mute all of their beams to avoid interference at terrestrial UEs within the given area. For example, in some aspects, the aerial node that is designated to exclusively perform UE-directed transmit behavior in a given area may be determined by the aerial nodes in a distributed process in which aerial nodes exchange coordination information (e.g., position, attitude angle, direction, velocity, or the like) and apply one or more priority rules to determine which aerial node has a highest priority. Additionally, or alternatively, the aerial node that is designated to exclusively perform UE-directed transmit behavior in a given area may be determined by a control node in a centralized process based on coordination information provided by different aerial nodes and based on the one or more priority rules.

For example, among multiple aerial nodes that are in the same three-dimensional airspace, the one or more priority rules may specify that an aerial node with a shortest distance, a lowest pathloss to a terrestrial UE, and/or a lowest altitude has a highest priority. In this example, a position of the terrestrial UE may be roughly estimated based on a direction of a receive beam (e.g., indicating the orientation of the terrestrial UE relative to the aerial node) and a position of the aerial node. In this way, configuring the aerial node with the shortest distance, the lowest pathloss to the terrestrial UE, and/or the lowest altitude may provide a higher receive power for the terrestrial UE. Additionally, or alternatively, the one or more priority rules may specify that, among multiple aircraft in the same three-dimensional airspace, an aerial node with a lowest velocity has a highest priority, which may provide a smaller possible Doppler shift to improve reception and decoding performance at the terrestrial UE. Additionally, or alternatively, the one or more priority rules may specify that, among multiple aircraft in the same three-dimensional airspace, an aerial node that will be entering an out-of-coverage area where the terrestrial UE is located soonest has a highest priority, which may reduce a latency associated with the emergency message relaying service by starting relay communications sooner. Additionally, or alternatively, the one or more priority rules may specify that, among multiple aircraft in the same three-dimensional airspace, an aerial node that has a longer remaining time within the out-of-coverage area where the terrestrial UE is located has a highest priority, which may increase the amount of time that the emergency message relaying service is available for the out-of-coverage terrestrial UE.

As indicated above, FIGS. 5A-5D are provided as examples. Other examples may differ from what is described with regard to FIGS. 5A-5D.

FIG. 6 is a diagram illustrating an example process 600 performed, for example, by an aerial node, in accordance with the present disclosure. Example process 600 is an example where the aerial node (e.g., the aerial node(s) described above with reference to FIGS. 3-4 and FIGS. 5A-5D) performs operations associated with aircraft beam muting for multi-aircraft emergency message relaying.

As shown in FIG. 6, in some aspects, process 600 may include determining, among a set of beams, one or more beams to be muted to mitigate potential interference associated with multiple aerial nodes transmitting to a terrestrial UE (block 610). For example, the aerial node (e.g., using communication manager 140 and/or beam muting component 708, depicted in FIG. 7) may determine, among a set of beams, one or more beams to be muted to mitigate potential interference associated with multiple aerial nodes transmitting to a terrestrial UE, as described above.

As further shown in FIG. 6, in some aspects, process 600 may include muting the one or more beams while transmitting, to the terrestrial UE, at least one of a discovery signal or feedback related to an emergency message relaying service (block 620). For example, the aerial node (e.g., using communication manager 140 and/or beam muting component 708, depicted in FIG. 7) may mute the one or more beams while transmitting, to the terrestrial UE, at least one of a discovery signal or feedback related to an emergency message relaying service, as described above.

Process 600 may include additional aspects, such as any single aspect or any combination of aspects described below and/or in connection with one or more other processes described elsewhere herein.

In a first aspect, the one or more beams to be muted are directed toward a ground coverage area that intersects with one or more beams of a neighboring aerial node.

In a second aspect, alone or in combination with the first aspect, process 600 includes receiving, from a control node, one or more triggers to define one or more times when the one or more beams are to be muted or one or more locations of the aerial node where the one or more beams are to be muted.

In a third aspect, alone or in combination with one or more of the first and second aspects, the one or more beams to be muted are determined during a beam muting coordination process that is triggered based at least in part on a message from a control node indicating that a distance between the aerial node and a neighboring aerial node satisfies a threshold.

In a fourth aspect, alone or in combination with one or more of the first through third aspects, the one or more beams to be muted are determined during a beam muting coordination process that is triggered based at least in part on a signal received from a neighboring aerial node having a reference signal received power measurement that satisfies a threshold.

In a fifth aspect, alone or in combination with one or more of the first through fourth aspects, the one or more beams to be muted are determined during a beam muting coordination process that is triggered based at least in part on radar detecting that a distance between the aerial node and a neighboring aerial node satisfies a threshold.

In a sixth aspect, alone or in combination with one or more of the first through fifth aspects, the one or more beams to be muted are determined during a beam muting coordination process that is triggered based at least in part on the aerial node and a neighboring aerial node being covered by a common satellite beam.

In a seventh aspect, alone or in combination with one or more of the first through sixth aspects, determining the one or more beams to be muted includes receiving, from a neighboring aerial node, coordination information indicating one or more parameters related to a kinematic state of the neighboring aerial node, determining, among the set of beams, a subset of beams directed toward a ground coverage area that intersects with one or more beams of the neighboring aerial node based at least in part on the coordination information, and determining, among the subset of beams, the one or more beams to be muted based at least in part on one or more priority rules.

In an eighth aspect, alone or in combination with one or more of the first through seventh aspects, the one or more priority rules indicate that, among a first beam and a second beam directed toward intersecting ground coverage areas, a beam of the aerial node with a lower altitude has a higher priority.

In a ninth aspect, alone or in combination with one or more of the first through eighth aspects, the one or more priority rules indicate that, among a first beam and a second beam directed toward intersecting ground coverage areas, a beam of the aerial node with a shorter line of sight path or lower pathloss to the terrestrial UE has a higher priority.

In a tenth aspect, alone or in combination with one or more of the first through ninth aspects, the one or more priority rules indicate that, among a first beam and a second beam directed toward intersecting ground coverage areas, a beam of the aerial node with a lower velocity has a higher priority.

In an eleventh aspect, alone or in combination with one or more of the first through tenth aspects, the one or more priority rules indicate that, among a first beam and a second beam directed toward intersecting ground coverage areas, a beam of the aerial node with a lower turbulence state has a higher priority.

In a twelfth aspect, alone or in combination with one or more of the first through eleventh aspects, determining the one or more beams to be muted includes transmitting, to a control node, coordination information indicating one or more parameters related to a kinematic state of the aerial node, and receiving, from the control node, information indicating the one or more beams to be muted based at least in part on the coordination information.

In a thirteenth aspect, alone or in combination with one or more of the first through twelfth aspects, determining the one or more beams to be muted includes determining one or more ground zones that are mapped to the aerial node, wherein the one or more beams to be muted are directed toward one or more ground zones that are outside the one or more ground zones mapped to the aerial node.

In a fourteenth aspect, alone or in combination with one or more of the first through thirteenth aspects, determining the one or more beams to be muted includes receiving, from a neighboring aerial node, coordination information indicating one or more parameters related to a kinematic state of the neighboring aerial node, wherein the one or more ground zones mapped to the aerial node are determined based at least in part on the coordination information.

In a fifteenth aspect, alone or in combination with one or more of the first through fourteenth aspects, determining the one or more beams to be muted includes transmitting, to a control node, coordination information indicating one or more parameters related to a kinematic state of the aerial node, and receiving, from the control node, information indicating the one or more ground zones that are mapped to the aerial node based at least in part on the coordination information.

In a sixteenth aspect, alone or in combination with one or more of the first through fifteenth aspects, determining the one or more beams to be muted includes receiving, from a neighboring aerial node, coordination information indicating one or more parameters related to a kinematic state of the neighboring aerial node, and determining, based at least in part on the coordination information and one or more priority rules, that the neighboring aerial node is to exclusively perform transmit behavior toward the terrestrial UE for the emergency message relaying service, wherein the one or more beams to be muted include each beam in the set of beams based at least in part on determining that the neighboring aerial node is to exclusively perform transmit behavior toward the terrestrial UE for the emergency message relaying service.

In a seventeenth aspect, alone or in combination with one or more of the first through sixteenth aspects, the one or more priority rules indicate that, among a first aerial node and a second aerial node that support the emergency message relaying service, an aerial node with a lower altitude, a shorter distance to the terrestrial UE, or a lower pathloss to the terrestrial UE has a higher priority.

In an eighteenth aspect, alone or in combination with one or more of the first through seventeenth aspects, the one or more priority rules indicate that, among a first aerial node and a second aerial node that support the emergency message relaying service, an aerial node with a lower velocity has a higher priority.

In a nineteenth aspect, alone or in combination with one or more of the first through eighteenth aspects, the one or more priority rules indicate that, among a first aerial node and a second aerial node that support the emergency message relaying service, an aerial node entering a ground coverage area of the terrestrial UE sooner has a higher priority.

In a twentieth aspect, alone or in combination with one or more of the first through nineteenth aspects, the one or more priority rules indicate that, among a first aerial node and a second aerial node that support the emergency message relaying service, an aerial node with a longer remaining time within a ground coverage area of the terrestrial UE has a higher priority.

In a twenty-first aspect, alone or in combination with one or more of the first through twentieth aspects, the one or more beams to be muted include each beam in the set of beams based at least in part on a message from a control node indicating that a neighboring aerial node is to exclusively perform transmit behavior toward the terrestrial UE for the emergency message relaying service.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
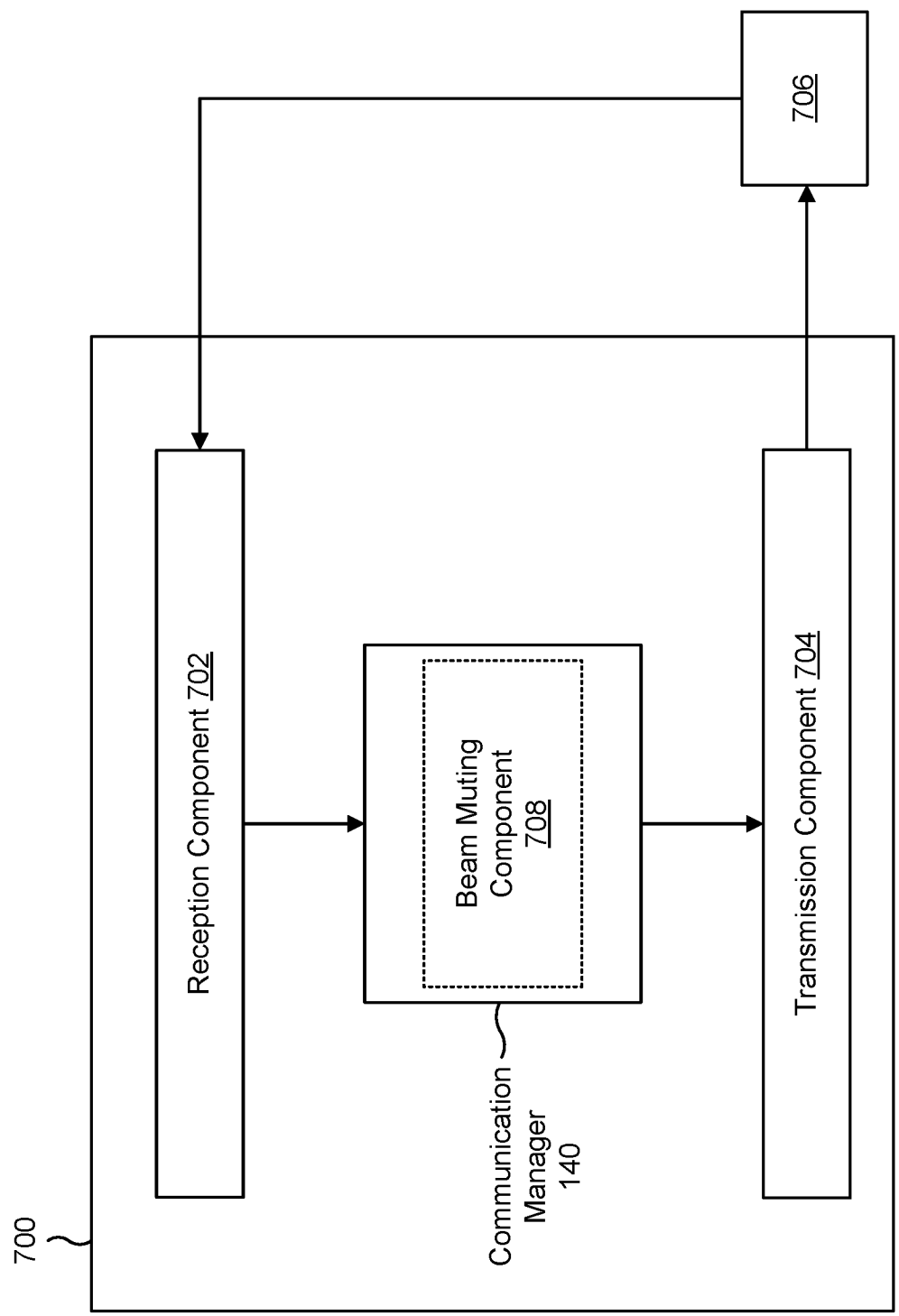
FIG. 7 is a diagram of an example apparatus for wireless communication, in accordance with the present disclosure.

FIG. 7 is a diagram of an example apparatus 700 for wireless communication. The apparatus 700 may be an aerial node, or an aerial node may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include the communication manager 140. The communication manager 140 may include a beam muting component 708, among other examples.

In some aspects, the apparatus 700 may be configured to perform one or more operations described herein in connection with FIGS. 5A-5D. Additionally, or alternatively, the apparatus 700 may be configured to perform one or more processes described herein, such as process 600 of FIG. 6. In some aspects, the apparatus 700 and/or one or more components shown in FIG. 7 may include one or more components of the UE described in connection with FIG. 2. Additionally, or alternatively, one or more components shown in FIG. 7 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 700. In some aspects, the reception component 702 may include one or more antennas, a modem, a demodulator, a MIMO detector, a receive processor, a controller/processor, a memory, or a combination thereof, of the aerial node described in connection with FIG. 2.

The transmission component 704 may transmit communications, such as reference signals, control information, data communications, or a combination thereof, to the apparatus 706. In some aspects, one or more other components of the apparatus 700 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modem, a modulator, a transmit MIMO processor, a transmit processor, a controller/processor, a memory, or a combination thereof, of the aerial node described in connection with FIG. 2. In some aspects, the transmission component 704 may be co-located with the reception component 702 in a transceiver.

The beam muting component 708 may determine, among a set of beams, one or more beams to be muted to mitigate potential interference associated with multiple aerial nodes transmitting to a terrestrial UE. The beam muting component 708 may mute the one or more beams while transmitting, to the terrestrial UE, at least one of a discovery signal or feedback related to an emergency message relaying service.

The reception component 702 may receive, from a control node, one or more triggers to define one or more times when the one or more beams are to be muted or one or more locations of the aerial node where the one or more beams are to be muted.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

The following provides an overview of some Aspects of the present disclosure:

Aspect 1: A method of wireless communication performed by an aerial node, comprising: determining, among a set of beams, one or more beams to be muted to mitigate potential interference associated with multiple aerial nodes transmitting to a terrestrial UE; and muting the one or more beams while transmitting, to the terrestrial UE, at least one of a discovery signal or feedback related to an emergency message relaying service.

Aspect 2: The method of Aspect 1, wherein the one or more beams to be muted are directed toward a ground coverage area that intersects with one or more beams of a neighboring aerial node.

Aspect 3: The method of any of Aspects 1-2, further comprising: receiving, from a control node, one or more triggers to define one or more times when the one or more beams are to be muted or one or more locations of the aerial node where the one or more beams are to be muted.

Aspect 4: The method of any of Aspects 1-3, wherein the one or more beams to be muted are determined during a beam muting coordination process that is triggered based at least in part on a message from a control node indicating that a distance between the aerial node and a neighboring aerial node satisfies a threshold.

Aspect 5: The method of any of Aspects 1-4, wherein the one or more beams to be muted are determined during a beam muting coordination process that is triggered based at least in part on a signal received from a neighboring aerial node having a reference signal received power measurement that satisfies a threshold.

Aspect 6: The method of any of Aspects 1-5, wherein the one or more beams to be muted are determined during a beam muting coordination process that is triggered based at least in part on radar detecting that a distance between the aerial node and a neighboring aerial node satisfies a threshold.

Aspect 7: The method of any of Aspects 1-6, wherein the one or more beams to be muted are determined during a beam muting coordination process that is triggered based at least in part on the aerial node and a neighboring aerial node being covered by a common satellite beam.

Aspect 8: The method of any of Aspects 1-7, wherein determining the one or more beams to be muted includes: receiving, from a neighboring aerial node, coordination information indicating one or more parameters related to a kinematic state of the neighboring aerial node; determining, among the set of beams, a subset of beams directed toward a ground coverage area that intersects with one or more beams of the neighboring aerial node based at least in part on the coordination information; and determining, among the subset of beams, the one or more beams to be muted based at least in part on one or more priority rules.

Aspect 9: The method of Aspect 8, wherein the one or more priority rules indicate that, among a first beam and a second beam directed toward intersecting ground coverage areas, a beam of the aerial node with a lower altitude has a higher priority.

Aspect 10: The method of any of Aspects 8-9, wherein the one or more priority rules indicate that, among a first beam and a second beam directed toward intersecting ground coverage areas, a beam of the aerial node with a shorter line of sight path or lower pathloss to the terrestrial UE has a higher priority.

Aspect 11: The method of any of Aspects 8-9, wherein the one or more priority rules indicate that, among a first beam and a second beam directed toward intersecting ground coverage areas, a beam of the aerial node with a lower velocity has a higher priority.

Aspect 12: The method of any of Aspects 8-9, wherein the one or more priority rules indicate that, among a first beam and a second beam directed toward intersecting ground coverage areas, a beam of the aerial node with a lower turbulence state has a higher priority.

Aspect 13: The method of any of Aspects 1-7, wherein determining the one or more beams to be muted includes: transmitting, to a control node, coordination information indicating one or more parameters related to a kinematic state of the aerial node; and receiving, from the control node, information indicating the one or more beams to be muted based at least in part on the coordination information.

Aspect 14: The method of Aspect 1, wherein determining the one or more beams to be muted includes: determining one or more ground zones that are mapped to the aerial node, wherein the one or more beams to be muted are directed toward one or more ground zones that are outside the one or more ground zones mapped to the aerial node.

Aspect 15: The method of Aspect 14, wherein determining the one or more beams to be muted includes: receiving, from a neighboring aerial node, coordination information indicating one or more parameters related to a kinematic state of the neighboring aerial node, wherein the one or more ground zones mapped to the aerial node are determined based at least in part on the coordination information.

Aspect 16: The method of Aspect 14, wherein determining the one or more beams to be muted includes: transmitting, to a control node, coordination information indicating one or more parameters related to a kinematic state of the aerial node; and receiving, from the control node, information indicating the one or more ground zones that are mapped to the aerial node based at least in part on the coordination information.

Aspect 17: The method of Aspect 1, wherein determining the one or more beams to be muted includes: receiving, from a neighboring aerial node, coordination information indicating one or more parameters related to a kinematic state of the neighboring aerial node; and determining, based at least in part on the coordination information and one or more priority rules, that the neighboring aerial node is to exclusively perform transmit behavior toward the terrestrial UE for the emergency message relaying service, wherein the one or more beams to be muted include each beam in the set of beams based at least in part on determining that the neighboring aerial node is to exclusively perform transmit behavior toward the terrestrial UE for the emergency message relaying service.

Aspect 18: The method of Aspect 17, wherein the one or more priority rules indicate that, among a first aerial node and a second aerial node that support the emergency message relaying service, an aerial node with a lower altitude, a shorter distance to the terrestrial UE, or a lower pathloss to the terrestrial UE has a higher priority.

Aspect 19: The method of any of Aspects 17-18, wherein the one or more priority rules indicate that, among a first aerial node and a second aerial node that support the emergency message relaying service, an aerial node with a lower velocity has a higher priority.

Aspect 20: The method of any of Aspects 17-19, wherein the one or more priority rules indicate that, among a first aerial node and a second aerial node that support the emergency message relaying service, an aerial node entering a ground coverage area of the terrestrial UE sooner has a higher priority.

Aspect 21: The method of any of Aspects 17-20, wherein the one or more priority rules indicate that, among a first aerial node and a second aerial node that support the emergency message relaying service, an aerial node with a longer remaining time within a ground coverage area of the terrestrial UE has a higher priority.

Aspect 22: The method of Aspect 1, wherein the one or more beams to be muted include each beam in the set of beams based at least in part on a message from a control node indicating that a neighboring aerial node is to exclusively perform transmit behavior toward the terrestrial UE for the emergency message relaying service.

Aspect 23: An apparatus for wireless communication at a device, comprising a processor; memory coupled with the processor; and instructions stored in the memory and executable by the processor to cause the apparatus to perform the method of one or more of Aspects 1-22.

Aspect 24: A device for wireless communication, comprising a memory and one or more processors coupled to the memory, the one or more processors configured to perform the method of one or more of Aspects 1-22.

Aspect 25: An apparatus for wireless communication, comprising at least one means for performing the method of one or more of Aspects 1-22.

Aspect 26: A non-transitory computer-readable medium storing code for wireless communication, the code comprising instructions executable by a processor to perform the method of one or more of Aspects 1-22.

Aspect 27: A non-transitory computer-readable medium storing a set of instructions for wireless communication, the set of instructions comprising one or more instructions that, when executed by one or more processors of a device, cause the device to perform the method of one or more of Aspects 1-22.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An aerial node for wireless communication, comprising:
 a memory; and
 one or more processors, coupled to the memory, configured to:
  determine, among a set of beams, one or more beams to be muted to mitigate potential interference associated with multiple aerial nodes transmitting to a terrestrial user equipment (UE); and
  mute the one or more beams while transmitting, to the terrestrial UE, at least one of a discovery signal or feedback related to an emergency message relaying service.

2. The aerial node of claim 1, wherein the one or more beams to be muted are directed toward a ground coverage area that intersects with one or more beams of a neighboring aerial node.

3. The aerial node of claim 1, wherein the one or more processors are further configured to:
 receive, from a control node, one or more triggers to define one or more times when the one or more beams are to be muted or one or more locations of the aerial node where the one or more beams are to be muted.

4. The aerial node of claim 1, wherein the one or more beams to be muted are determined during a beam muting coordination process that is triggered based at least in part on one or more of:
 a message from a control node indicating that a distance between the aerial node and a neighboring aerial node satisfies a threshold,
 a signal received from a neighboring aerial node having a reference signal received power measurement that satisfies a threshold,
 radar detecting that a distance between the aerial node and a neighboring aerial node satisfies a threshold, or
 the aerial node and a neighboring aerial node being covered by a common satellite beam.

5. The aerial node of claim 1, wherein the one or more processors, to determine the one or more beams to be muted, are configured to:
 receive, from a neighboring aerial node, coordination information indicating one or more parameters related to a kinematic state of the neighboring aerial node;
 determine, among the set of beams, a subset of beams directed toward a ground coverage area that intersects with one or more beams of the neighboring aerial node based at least in part on the coordination information; and
 determine, among the subset of beams, the one or more beams to be muted based at least in part on one or more priority rules.

6. The aerial node of claim 5, wherein the one or more priority rules indicate that, among a first beam and a second beam directed toward intersecting ground coverage areas, a beam of the aerial node with a lower altitude, a shorter line of sight path or lower pathloss to the terrestrial UE, a lower velocity, or a lower turbulence state has a higher priority.

7. The aerial node of claim 1, wherein the one or more processors, to determine the one or more beams to be muted, are configured to:
 transmit, to a control node, coordination information indicating one or more parameters related to a kinematic state of the aerial node; and
 receive, from the control node, information indicating the one or more beams to be muted based at least in part on the coordination information.

8. The aerial node of claim 1, wherein the one or more processors, to determine the one or more beams to be muted, are configured to:
 determine one or more ground zones that are mapped to the aerial node, wherein the one or more beams to be muted are directed toward one or more ground zones that are outside the one or more ground zones mapped to the aerial node.

9. The aerial node of claim 8, wherein the one or more processors, to determine the one or more beams to be muted, are configured to:
 receive, from a neighboring aerial node, coordination information indicating one or more parameters related to a kinematic state of the neighboring aerial node, wherein the one or more ground zones mapped to the aerial node are determined based at least in part on the coordination information.

10. The aerial node of claim 8, wherein the one or more processors, to determine the one or more beams to be muted, are configured to:
 transmit, to a control node, coordination information indicating one or more parameters related to a kinematic state of the aerial node; and
 receive, from the control node, information indicating the one or more ground zones that are mapped to the aerial node based at least in part on the coordination information.

11. The aerial node of claim 1, wherein the one or more processors, to determine the one or more beams to be muted, are configured to:
 receive, from a neighboring aerial node, coordination information indicating one or more parameters related to a kinematic state of the neighboring aerial node; and
 determine, based at least in part on the coordination information and one or more priority rules, that the neighboring aerial node is to exclusively perform transmit behavior toward the terrestrial UE for the emergency message relaying service, wherein the one or more beams to be muted include each beam in the set of beams based at least in part on determining that the neighboring aerial node is to exclusively perform transmit behavior toward the terrestrial UE for the emergency message relaying service.

12. The aerial node of claim 11, wherein the one or more priority rules indicate that, among a first aerial node and a second aerial node that support the emergency message relaying service, an aerial node with a lower altitude, a shorter distance to the terrestrial UE, a lower pathloss to the terrestrial UE, or a lower velocity has a higher priority.

13. The aerial node of claim 11, wherein the one or more priority rules indicate that, among a first aerial node and a second aerial node that support the emergency message relaying service, an aerial node entering a ground coverage area of the terrestrial UE sooner or an aerial node with a longer remaining time within a ground coverage area of the terrestrial UE has a higher priority.

14. The aerial node of claim 1, wherein the one or more beams to be muted include each beam in the set of beams based at least in part on a message from a control node indicating that a neighboring aerial node is to exclusively perform transmit behavior toward the terrestrial UE for the emergency message relaying service.

15. A method of wireless communication performed by an aerial node, comprising:
   determining, among a set of beams, one or more beams to be muted to mitigate potential interference associated with multiple aerial nodes transmitting to a terrestrial user equipment (UE); and
   muting the one or more beams while transmitting, to the terrestrial UE, at least one of a discovery signal or feedback related to an emergency message relaying service.

16. The method of claim 15, wherein the one or more beams to be muted are directed toward a ground coverage area that intersects with one or more beams of a neighboring aerial node.

17. The method of claim 15, further comprising:
   receiving, from a control node, one or more triggers to define one or more times when the one or more beams are to be muted or one or more locations of the aerial node where the one or more beams are to be muted.

18. The method of claim 15, wherein the one or more beams to be muted are determined during a beam muting coordination process that is triggered based at least in part on one or more of:
   a message from a control node indicating that a distance between the aerial node and a neighboring aerial node satisfies a threshold,
   a signal received from a neighboring aerial node having a reference signal received power measurement that satisfies a threshold,
   radar detecting that a distance between the aerial node and a neighboring aerial node satisfies a threshold, or
   the aerial node and a neighboring aerial node being covered by a common satellite beam.

19. The method of claim 15, wherein determining the one or more beams to be muted comprises:
   receiving, from a neighboring aerial node, coordination information indicating one or more parameters related to a kinematic state of the neighboring aerial node;
   determining, among the set of beams, a subset of beams directed toward a ground coverage area that intersects with one or more beams of the neighboring aerial node based at least in part on the coordination information; and
   determining, among the subset of beams, the one or more beams to be muted based at least in part on one or more priority rules.

20. The method of claim 19, wherein the one or more priority rules indicate that, among a first beam and a second beam directed toward intersecting ground coverage areas, a beam of the aerial node with a lower altitude, a shorter line of sight path or lower pathloss to the terrestrial UE, a lower velocity, or a lower turbulence state has a higher priority.

21. The method of claim 15, wherein determining the one or more beams to be muted comprises:
   transmitting, to a control node, coordination information indicating one or more parameters related to a kinematic state of the aerial node; and
   receiving, from the control node, information indicating the one or more beams to be muted based at least in part on the coordination information.

22. The method of claim 15, wherein determining the one or more beams to be muted comprises:
   determining one or more ground zones that are mapped to the aerial node, wherein the one or more beams to be muted are directed toward one or more ground zones that are outside the one or more ground zones mapped to the aerial node.

23. The method of claim 22, wherein determining the one or more beams to be muted comprises:
   receiving, from a neighboring aerial node, coordination information indicating one or more parameters related to a kinematic state of the neighboring aerial node, wherein the one or more ground zones mapped to the aerial node are determined based at least in part on the coordination information.

24. The method of claim 22, wherein determining the one or more beams to be muted comprises:
   transmitting, to a control node, coordination information indicating one or more parameters related to a kinematic state of the aerial node; and
   receiving, from the control node, information indicating the one or more ground zones that are mapped to the aerial node based at least in part on the coordination information.

25. The method of claim 15, wherein determining the one or more beams to be muted comprises:
   receiving, from a neighboring aerial node, coordination information indicating one or more parameters related to a kinematic state of the neighboring aerial node; and
   determining, based at least in part on the coordination information and one or more priority rules, that the neighboring aerial node is to exclusively perform transmit behavior toward the terrestrial UE for the emergency message relaying service, wherein the one or more beams to be muted include each beam in the set of beams based at least in part on determining that the neighboring aerial node is to exclusively perform transmit behavior toward the terrestrial UE for the emergency message relaying service.

26. The method of claim 25, wherein the one or more priority rules indicate that, among a first aerial node and a second aerial node that support the emergency message relaying service, an aerial node with a lower altitude, a shorter distance to the terrestrial UE, a lower pathloss to the terrestrial UE, or a lower velocity has a higher priority.

27. The method of claim 25, wherein the one or more priority rules indicate that, among a first aerial node and a second aerial node that support the emergency message relaying service, an aerial node entering a ground coverage area of the terrestrial UE sooner or an aerial node with a longer remaining time within a ground coverage area of the terrestrial UE has a higher priority.

28. The method of claim 15, wherein the one or more beams to be muted include each beam in the set of beams based at least in part on a message from a control node indicating that a neighboring aerial node is to exclusively perform transmit behavior toward the terrestrial UE for the emergency message relaying service.

29. A non-transitory computer-readable medium storing a set of instructions for wireless communication, the set of instructions comprising:
- one or more instructions that, when executed by one or more processors of an aerial node, cause the aerial node to:
  - determine, among a set of beams, one or more beams to be muted to mitigate potential interference associated with multiple aerial nodes transmitting to a terrestrial user equipment (UE); and
  - mute the one or more beams while transmitting, to the terrestrial UE, at least one of a discovery signal or feedback related to an emergency message relaying service.

30. An apparatus for wireless communication, comprising:
- means for determining, among a set of beams, one or more beams to be muted to mitigate potential interference associated with multiple aerial nodes transmitting to a terrestrial user equipment (UE); and
- means for muting the one or more beams while transmitting, to the terrestrial UE, at least one of a discovery signal or feedback related to an emergency message relaying service.

* * * * *